April 29, 1952
W. T. ENGEL
2,595,063
PRESSURE GAUGE
Filed Oct. 18, 1949
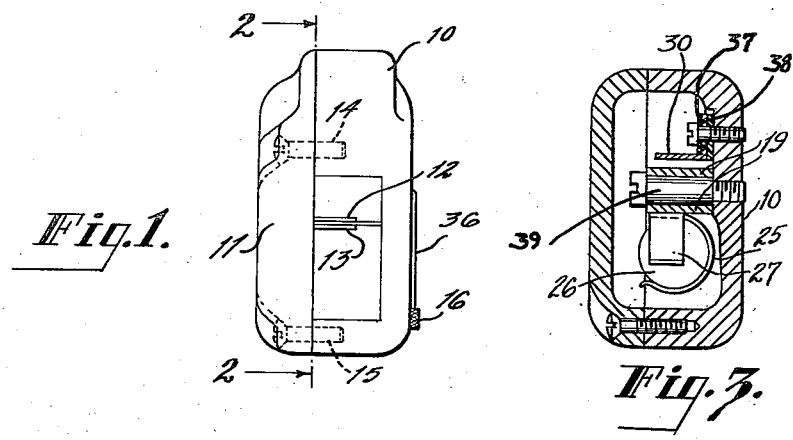
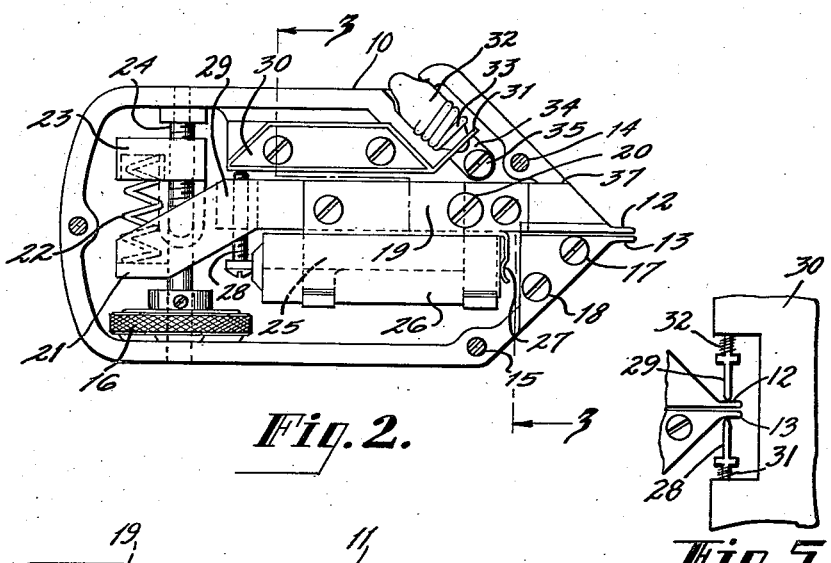
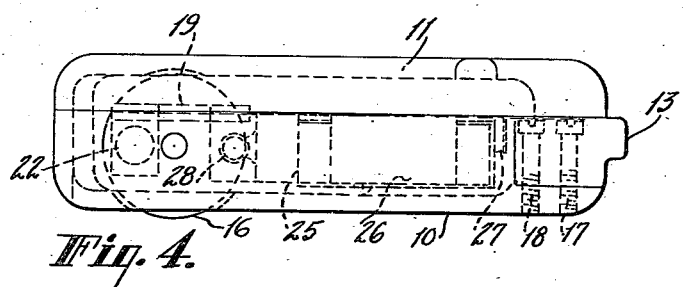
Inventor
WILLIAM T. ENGEL
By William A. Zalesak
Attorney Patented Apr. 29, 1952

2,595,063

UNITED STATES PATENT OFFICE 2,595,063

PRESSURE GAUGE

William T. Engel, Union, N. J., assignor to Radio Corporation of America, a corporation of Delaware Application October 18, 1949, Serial No. 122,075

8 Claims. (Cl. 177—311)

The present invention relates to a pressure gauge and more particularly to a pressure gauge for measuring the pressure between two members or bodies.

In some instances it is desired to check rapidly the magnitude of forces urging two members or bodies together. For example, in welding operations, particularly in the electronics industry where sensitive welding machines are employed for delicate welding procedures, it is necessary that the welding electrodes be adjusted so as to exert a predetermined pressure on the work and that this pressure be maintained without change during a plurality of welding operations. Sometimes during the operation of a welding machine of this type the pressure to which the electrodes thereof is originally adjusted becomes unintentionally changed as a consequence of vibration or from other causes. Such change in pressure results in loss of uniformity of the work performed by the welding machine, which loss is particularly serious in precision work. Accordingly to correct such undesired deviations from the pressure desired, it is customary to check frequently the pressure of the electrodes on the work and to make necessary adjustments where the pressure has changed.

The practices generally followed heretofore in checking the pressure between welding electrodes involve either the crude and haphazard method of depending on the "feel" of the operator or by trial and error, according to which a number of adjustments and tests are made before the desired pressure is secured. These prior practices render uniformity of work very difficult to obtain and as indicated above this is particularly serious in precision work.

Accordingly it is the object of the invention to provide a device for rapidly and accurately determining the pressure between two bodies urged together.

Another object is to provide an adjustable pressure gauge for responding in a visual indication to any predetermined pressure desired betwen two bodies.

A further object is to provide a pressure gauge having an indicating means that becomes fluctuating when a predetermined pressure is exerted thereon.

Another object is to provide a pressure gauge having a more pronounced indication in response to a predetermined pressure to which the gauge is set than to other pressures.

A further object is to provide a pressure gauge having two easily recognized indications for deviations of the pressure between two bodies above and below a predetermined pressure for permitting adjustments in pressure in the required direction.

Another object is to provide a pressure measuring device that is adjustable to a predetermined pressure and responds in one visual indication to a pressure lower than the predetermined pressure, in another visual indication to pressures above the predetermined pressure, and in a rapid succession of the two visual indications referred to when a desired predetermined pressure is secured.

A further object is to provide a pressure gauge for frequently testing the pressure between electrodes of delicate welding mechanisms for assuring a continued predetermined pressure between said electrodes for providing a plurality of uniform welds.

A device incorporating the invention may include a housing having two coextensive and laterally spaced elements or fingers extending therefrom and adapted for insertion between two pressure producing members or bodies such as two welding electrodes. The fingers are urged apart and disposed across the space between the two bodies in such a manner that one finger engages one of said bodies and the other finger engages the other body. The pressure between the bodies will then be transmitted to the fingers and result in a movement of the fingers toward each other if the pressure is greater than the force urging the fingers apart. One of the fingers is linked to an adjustable biasing means such as a spring within the housing which can be set to provide a predetermined pressure urging the fingers apart. An electrical contact member is connected to the linked finger referred to and is movable with said finger. The housing also includes an incandescent lamp in series with the contact member. The lamp remains unlighted when the contact is open and lights up when the contact is closed. The spring referred to may be adjusted so that a predetermined pressure exerted on the fingers results in an intermittent opening and closing of the contact member causing the lamp to become energized and deenergized in rapid succession to thereby provide an easily recognized indication of the predetermined pressure. A steady unlighted or lighted condition of the lamp will indicate not only an undesired pressure but in addition will guide the operator to the direction in which an adjustment of the pressure should be made to secure the predetermined pressure.

Once the gauge has been set to a predetermined pressure it will continue to respond in the manner indicated to said predetermined pressure throughout a plurality of tests. The ease of use and the quickly recognizable indication of the desired pressure as well as the direction in which an adjustment of an undesirable pressure should be made, that the gauge of the invention provides, render it particularly advantageous for frequent tests of the pressure between bodies such as welding electrodes to thereby avoid prolonged deviations from this desired pressure and promote uniformity in work.

Further objects and advantages of the invention will become evident as the present description proceeds.

Referring to the drawing:

Figure 1 is an end elevation of a pressure gauge incorporating the invention;

Figure 2 is a longitudinal sectional elevation along the line 2—2 of Figure 1 and in a plane where two longitudinal portions of the gauge are joined;

Figure 3 is a transverse view along the line 3—3 of Figure 2;

Figure 4 is a bottom view of Figure 2; and

Figure 5 shows the gauge in operative relation with respect to two oppositely disposed resiliently mounted electrodes of a welding device.

Referring in more detail to the drawing there is shown in Figure 1 thereof a pressure gauge according to the invention which includes a housing formed by shell members 10, 11 and fingers 12, 13 extending from one end of the housing. The two shell members referred to are suitably held together by screws 14, 15. Projecting from one side of the housing is a portion of a knurled screw head 16 which provides means for readily adjusting the pressure urging fingers 12, 13 apart to any predetermined value.

As shown more clearly in Figure 2, finger 13 is fixed to the housing shell 10 by screws 17, 18. Finger 12 is fixed to one end of a support including a shank 19 pivoted to the shell 10 at 20. The other end of the support includes an angularly deflected portion 21 having a seat for engaging one end of spring 22. The other end of the spring abuts against a seat 23 having internal threads for engaging screw 24 fixed to knurled head 16.

Fixed to the shank 19 is a clip 25 for supporting a dry battery 26 having one end in electrical contact with the shell 10 as by means of contact 27 and the other end in contact with one end of screw 28. The screw 28 is mounted insulatingly on shank 10 by means of the insulating body 29. The other end of the screw 28 is adapted to form a relay with and contact a metal member 30 having a tab 31 in contact with the base of an incandescent lamp 32. Member 30 is insulatingly mounted on shell 10 between washers 37, 38 shown in Figure 3. The lamp 32 is threaded into a metal socket 33 fixed to bracket 34, which is in turn fixed to the shell 10 as by a screw 35. An indicating scale 36 may be provided for indicating the pressure of the spring 22 in response to adjustment of the knurled head 16. To control the maximum degree of separation of fingers 12, 13, the shank 19 is adapted to abut against a shoulder 37 on shell 10.

In operation the knurled head 16 is rotated to provide a desired pressure on spring 22 to urge the fingers 12, 13 apart with a predetermined magnitude of force. Indicating scale 36 will indicate when the head 16 has been rotated sufficiently for placing a predetermined tension on the spring 22. With the fingers 12, 13 extended between two bodies which may be welding electrodes that are urged together, a force will be applied by said bodies to the fingers urging them together. If this force is greater than the force of spring 22 in urging the fingers apart, the shank 19 will rotate on its pivot 20 causing the fingers to approach each other and complete a contact between one end of screw 28 and the metal member 30. This contact will energize lamp 32 causing it to light up. When the pressure on the fingers 12, 13 is less than the force of spring 22 urging them apart, no movement of finger 19 will take place and accordingly the lamp 32 will remain deenergized.

The gauge of the invention therefore provides one indication when the pressure on the fingers 12, 13 is above a predetermined pressure and another clearly differentiated indication when the pressure is below said predetermined pressure. Each of these indications it will be noted, clearly shows an operator whether to increase or decrease the pressure between the bodies tested, such as welding electrodes, for reaching the desired pressure.

When the pressure on the bodies is adjusted to agree with a predetermined pressure to which the gauge is set a precarious balance will occur between the forces urging the fingers apart and together, and the screw 28 will as a consequence form a relatively weak contact with the metal member 30, resulting in intermittent contacts therebetween and causing the lamp 32 to go on and off in rapid succession. Such action on the part of the lamp is readily detected by an operator since it is more pronounced visually than the steady effects produced by pressures requiring correction.

The precarious balance referred to between the forces urging the fingers apart and together occurs as a consequence of a "hunting" action between the force urging together the bodies to be pressure tested and the predetermined force urging the fingers 12, 13 of the pressure gauge apart. The force urging together the bodies to be pressure tested, for example, in the case of welding electrodes 28, 29 of a welding device 30, shown in Figure 5, is provided by yielding means such as springs 31, 32. The force urging the fingers 12, 13 apart is also dependent on yielding means such as the spring 22. A balance between the forces referred to ultimately results in a state of rest of the bodies being pressure tested and the relatively movable fingers 12, 13, as a consequence of which the indication of the pressure gauge becomes constant. However, before this state of rest takes place, the original inequality in the forces referred to, caused either by a departure of the force urging together the bodies such as the electrodes 28, 29 to be pressure tested from the predetermined force urging fingers 12, 13 apart, or in transmitting an additional force tending to cause the fingers to come together at the time the fingers are first inserted between the bodies referred to, results in a temporary oscillation of the bodies and fingers. This temporary oscillation on the part of the fingers 12, 13 will cause finger 12 and the screw 28 forming a contact member of the relay described before herein to oscillate or vibrate, resulting in a rapid opening and closing of the relay with a consequent fluctuation in the indicator or lamp 32. While this fluctuation is temporary, it is of adequate duration to provide a noticeable indication readily recognized by an operator. It will be noted that this fluctuation occurs only when the pressure between the bodies to be tested is substantially equal to the pressure urging fingers 12, 13 apart and is therefore an indication that a desired pressure between the bodies referred to exists.

If the shell 10 is made of an insulating material a direct lead, not shown, is required between the clip 27 and metal bracket 34 supporting the socket for the lamp 32 in order to complete the circuit through the lamp. If the shell 10 is made of electrically conducting material as shown in the drawing, clip 27 need only be connected to any convenient portion of the shell such as through shank 19 and screw 39 shown in Figure 3 to complete the desired circuit.

It is thus apparent that I have provided a novel and useful gauge for the testing of pressures between two bodies. It is characterized by the advantage that it definitely indicates the direction in which the pressure between the bodies requires change in order to reach a predetermined pressure. It also provides a more pronounced indication when the proper pressure is attained or exists between the two bodies than when the desired pressure is lacking.

In addition, the fingers 12, 13 of my gauge may be separated by a distance equal to that of the work so that the pressure indicated by my gauge more closely approximates the pressure of the bodies or electrodes upon the work. To this end the fixed finger 13 may be readily removed from the housing by releasing the screws 17, 18 by which it is fixed, and a structure including a finger having the desired spacing from the finger 12 may be substituted. This spacing may be made extremely small so that the fingers may be caused to traverse the space required by a very small work piece, or the spacing may be made appreciably large to extend across the space required by a larger work piece.

Furthermore, my gauge is self-contained, requiring no external connections for its energization and is convenient to handle. These advantages encourage a frequent check of pressures to assure a preservation of a desired pressure and provide uniformity in work.

Various modifications may be made in the device described without departing from the spirit of the invention and it is accordingly desired to include such modifications within the scope of the appended claims.

I claim:

1. A pressure indicating apparatus including a pair of relatively movable elements to be inserted between two resiliently mounted members urged toward each other, and resilient means for urging said elements away from each other with a predetermined force, one of said elements comprising a movable contact of a switch for opening and closing an electric circuit, whereby a lamp in said circuit is energized and deenergized in response to relative movement of said elements for indicating a pressure between said members of said predetermined force.

2. A pressure indicating apparatus including a pair of relatively movable elements to be inserted between resiliently mounted pressure producing members, and resilient means for biasing said elements away from each other with a predetermined force, one of said movable elements comprising a contact terminal of a switch for closing and opening an electric circuit for indicating the pressure between said members when pressure is exerted on said elements by said pressure producing members.

3. A pressure indicating apparatus for indicating the pressure between resiliently mounted members of a pressure producing device, comprising a pair of relatively movable elements to be inserted between said resiliently mounted members, and means for resiliently biasing said elements away from each other with a predetermined force whereby a pressure between said members substantially equal to the force of said biasing means causes a momentary fluctuating movement of one of said elements relative to the other of said elements for providing a fluctuating indication of a predetermined desired pressure between said members.

4. A pressure testing device for determining whether the pressure between two resiliently mounted bodies is of predetermined magnitude, comprising resiliently mounted means adapted to engage said bodies and respond in a unidirectional movement to pressures between said bodies above and below said predetermined magnitude, and in a fluctuating movement to a pressure substantially equal to said predetermined magnitude, and adjustable means for causing said resiliently mounted means to respond in a fluctuating movement to a pressure of different predetermined magnitude, whereby a fluctuating indication is provided in response to a predetermined desired pressure between said bodies and a steady indication in response to other pressures between said bodies.

5. A pressure indicating apparatus for testing the pressure between resiliently mounted bodies, comprising a pair of relatively movable elements to be inserted between said bodies, resilient means for urging said elements away from each other, and means for adjusting the force of said resilient means to a predetermined magnitude, whereby said elements respond in a unidirectional movement when the pressure between said bodies is greater than said predetermined magnitude and in a fluctuating movement when the last named pressure is substantially equal to said predetermined magnitude, one of said elements forming an electrical contact for closing an electric circuit in response to the unidirectional movement of said elements for providing a steady indication of undesired pressures between said bodies, and for successively closing and opening said circuit to provide a fluctuating indication of a desired predetermined pressure between said bodies.

6. A pressure indicating apparatus including a pair of elements to be inserted between resiliently mounted pressure producing members, a support for said elements, one of said elements being fixed to said support, and the other of said elements being pivotally mounted on said support for angular displacement from said one of said elements, yielding meanings engaging said other of said elements for urging said elements to a predetermined angular displacement with a predetermined force, said other of said elements constituting a movable contact member of a switch for opening and closing an electric circuit, said contact member being arranged to respond in a momentary fluctuating movement when the pressure between said pressure producing members is characterized by a force substantially equal to said predetermined force, whereby an indication is provided that is momentarily fluctuating when the force exerted by said resiliently mounted pressure producing members is substantially equal to said predetermined force.

7. A pressure indicating device comprising a casing, two parallel and co-extensive fingers extending from said casing for receiving the thrust between two resiliently supported bodies urged together, a movable support for one of said fingers, and an adjustable resilient means engaging said support for rendering said support responsive in movement to thrusts from said bodies on said fingers above a predetermined force magnitude only, said support comprising a movable contact for a switch across an electric circuit, for closing said switch in response to thrusts on said fingers above said predetermined force magnitude for actuating a device energized by said circuit, said support responding in a fluctuating movement to a thrust on said fingers by said bodies of said predetermined force magnitude and in a unidirectional movement to thrusts above said force magnitude, whereby said device is actuated differently in response to thrusts from said bodies of different force magnitudes for providing an easily recognized indication of said thrust of predetermined force magnitude.

8. An apparatus for quickly testing the pressure between members resiliently mounted in opposed relation, comprising two relatively movable parallel and co-extensive fingers, one of said fingers being fixed to a casing of the apparatus, a support for the other of said fingers, said support being movable with respect to said casing for moving said other of said fingers laterally with respect to said one of said fingers, adjustable resilient means engaging said support for limiting movement of said support to forces on said fingers above a predetermined force, said support comprising a terminal of an electric circuit for closing said circuit when moved, said adjustable means urging said support to circuit opening position, whereby a device in said circuit is energized to provide an immediate characteristic indication of the pressure between said members when said fingers are placed between said members.

WILLIAM T. ENGEL.

REFERENCES CITED

The following references are of record in the file of this patent:

UNITED STATES PATENTS

| Number | Name | Date |
|---|---|---|
| 1,816,464 | Biggert, Jr. | July 28, 1931 |
| 2,217,509 | Bryant | Oct. 8, 1940 |